(12) United States Patent
van Zelm et al.

(10) Patent No.: US 10,268,169 B2
(45) Date of Patent: Apr. 23, 2019

(54) ADAPTIVE SAMPLE-BY-SAMPLE CONTROLLER FOR UNDER-DETERMINED SYSTEMS

(71) Applicant: MICROSOFT TECHNOLOGY LICENSING, LLC, Redmond, WA (US)

(72) Inventors: John-Peter van Zelm, Calgary (CA); Peter Zahariev Rashev, Calgary (CA)

(73) Assignee: Microsoft Technology Licensing, LLC, Redmond, WA (US)

( * ) Notice: Subject to any disclaimer, the term of this patent is extended or adjusted under 35 U.S.C. 154(b) by 823 days.

(21) Appl. No.: 14/490,605

(22) Filed: Sep. 18, 2014

(65) Prior Publication Data
US 2015/0005902 A1   Jan. 1, 2015

Related U.S. Application Data

(63) Continuation of application No. 11/693,512, filed on Mar. 29, 2007, now Pat. No. 8,886,341.

(60) Provisional application No. 60/788,971, filed on Apr. 4, 2006, provisional application No. 60/788,970, filed on Apr. 4, 2006.

(51) Int. Cl.
  *G05B 13/04*   (2006.01)
  *G06N 99/00*   (2010.01)
(52) U.S. Cl.
  CPC ........... *G05B 13/04* (2013.01); *G06N 99/005* (2013.01)

(58) Field of Classification Search
None
See application file for complete search history.

(56) References Cited

U.S. PATENT DOCUMENTS

| | | | |
|---|---|---|---|
| 3,767,900 A | 10/1973 | Chao et al. | |
| 4,577,334 A | 3/1986 | Boer et al. | |
| 4,578,747 A | 3/1986 | Hideg et al. | |
| 4,712,173 A * | 12/1987 | Fujiwara | G05D 23/1925 137/805 |
| 4,717,894 A | 1/1988 | Allen et al. | |
| 5,049,832 A | 9/1991 | Cavers | |
| 5,113,414 A | 5/1992 | Karam et al. | |
| 5,119,399 A | 6/1992 | Karl et al. | |
| 5,371,481 A | 12/1994 | Erkki et al. | |
| 5,524,285 A | 6/1996 | Wray et al. | |
| 5,613,226 A | 3/1997 | Kanami | |
| 5,647,023 A | 7/1997 | Agazzi et al. | |

(Continued)

OTHER PUBLICATIONS

"BPAI Decision", U.S. Appl. No. 11/693,512, May 30, 2014, 13 pages.

(Continued)

*Primary Examiner* — Sean Shechtman
(74) *Attorney, Agent, or Firm* — Ray Quinney & Nebeker, P.C.; Thomas M. Hardman; Gregg W. Wisdom

(57) ABSTRACT

A device and method to adapt a model in a underdetermined adaptive system that provides an output in response to an input. A controller provides parameters to the model in a transceiver system, composed of linearizers, equalizers, or estimators as a function of an error signal. The controller and the model parameters are manipulated to allow agnosticism with respect to input signals or model complexity, enabling robust operation and efficient implementation.

14 Claims, 4 Drawing Sheets

(56) References Cited

U.S. PATENT DOCUMENTS

| | | | |
|---|---|---|---|
| 5,677,995 A * | 10/1997 | Mager | G05B 13/0275 |
| | | | 706/1 |
| 5,732,333 A | 3/1998 | Cox et al. | |
| 5,740,520 A | 4/1998 | Cyze et al. | |
| 5,745,597 A | 4/1998 | Agazzi et al. | |
| 5,786,728 A | 7/1998 | Alinikula | |
| 5,923,712 A | 7/1999 | Leyendecker et al. | |
| 5,990,738 A | 11/1999 | Wright et al. | |
| 6,128,541 A | 10/2000 | Junk | |
| 6,133,789 A | 10/2000 | Braithwaite | |
| 6,147,553 A | 11/2000 | Kolanek | |
| 6,169,463 B1 | 1/2001 | Rishi et al. | |
| 6,194,964 B1 | 2/2001 | Jun | |
| 6,208,698 B1 | 3/2001 | Rossano et al. | |
| 6,266,517 B1 | 7/2001 | Fitzpatrick et al. | |
| 6,275,685 B1 | 8/2001 | Wessel et al. | |
| 6,298,096 B1 | 10/2001 | George | |
| 6,342,810 B1 | 1/2002 | Wright et al. | |
| 6,687,235 B1 | 2/2004 | Chu | |
| 7,085,330 B1 | 8/2006 | Shirali | |
| 7,551,668 B2 | 6/2009 | Higashino et al. | |
| 8,886,341 B1 | 11/2014 | van Zelm et al. | |
| 2001/0022532 A1 | 9/2001 | Dolman | |
| 2002/0123869 A1 | 9/2002 | Koppl et al. | |
| 2002/0181611 A1 | 12/2002 | Kim | |
| 2003/0146791 A1 | 8/2003 | Shwarts et al. | |
| 2004/0198268 A1 | 10/2004 | Rashev et al. | |
| 2007/0036211 A1 | 2/2007 | Kajiwara | |
| 2008/0152037 A1 | 6/2008 | Kim et al. | |

OTHER PUBLICATIONS

"Final Office Action", U.S. Appl. No. 11/693,512, dated Mar. 11, 2010, 26 pages.

"Final Office Action", U.S. Appl. No. 11/693,512, dated Dec. 9, 2009, 23 pages.

"Non-Final Office Action", U.S. Appl. No. 11/689,374, dated Nov. 2, 2009, 8 ages.

"Non-Final Office Action", U.S. Appl. No. 11/693,512, dated Jun. 1, 2009, 19 pages.

"Non-Final Office Action", U.S. Appl. No. 11/693,512, dated Oct. 28, 2010, 22 pages.

"Notice of Allowance", U.S. Appl. No. 11/693,512, dated Aug. 6, 2014, 6 pages.

"Restriction Requirement", U.S. Appl. No. 11/693,512, dated Jan. 13, 2009, 7 pages.

Faulkner, et al., "Amplifier Linerisation Using RF Feedback and Feedforward Techniques", Proceedings of the IEEE Vehicular Technology Conference, Chicago, IL, Jul. 25, 1995, pp. 525-529.

Jones, et al., "Phase error correcting vector modulator for personal communications network (PCN) transceivers", Electronics Letters 27(14), Jul. 4, 1991, pp. 1230-1231.

Lohtia, et al., "Power Amplifier Linearization Using Cubic Spline Interpolation", IEEE Vehicular Technology Conference, May 18, 1993, pp. 676-679.

Sano, et al., "Identification of Hammerstein-Wiener System with Application to Compensation for Nonlinear Distortion", SICE 2002: Proceedings of the 41st SICE Annual Conference; vol. 3, Aug. 5, 2002, pp. 1521-1526.

* cited by examiner

ADAPTIVE SAMPLE-BY-SAMPLE CONTROLLER FOR UNDER-DETERMINED SYSTEMS

RELATED APPLICATION

This application is a continuation of and claims priority to U.S. patent application Ser. No. 11/693,512 filed Mar. 29, 2007, Ser. No. 11/693,512 claims the benefit under 35 U.S.C. 119(e) of U.S. Provisional Application Ser. No. 60/788,971 filed Apr. 4, 2006 and of U.S. Provisional Application Ser. No. 60/788,970 filed Apr. 4, 2006, the disclosures of which are incorporated by reference herein in their entirety.

BACKGROUND

An undetermined system may have multiple or infinite solutions, in opposition to a determined system with a single unique solution. Such systems may find use in the emerging concept of applying System-on-Chip (SoC) to the case of Radio-on-Chip (software defined radio) in wireless base stations. Such systems may apply adaptive equalizers, linearizers or identifiers in either the transmitter or receiver or both.

These systems can be decomposed into a plant and model. The plant represents the physical system to be corrected (such as, but not limited to, a nonlinear transmitter) or identified and the model represents the artificial structure to be adapted to correct (through inversion) or mimic (through modeling) the plant, depending on the system architecture. The models are ideally trained (adapted) in a test or characterization mode, whereby the system is taken out of service periodically and a known test waveform applied to the system that is of similar frequency bandwidth as the plant bandwidth. However, the conflicting requirements to minimize system down-time while providing a suitable training frequency to maintain feature performance over time, precludes a characterization mode. There is a need to be able to provide adaptation with the transmission signal.

As modern radio products must support a variety of signal bandwidths, including narrow bandwidth signals, there exists the possibility for the plant bandwidth to be significantly larger than the signal bandwidth. In this case, there is insufficient information to accurately solve the system of equations characterizing the plant and the associated model—there are in effect more unknowns than equations. This scenario is described in mathematics as an under-determined system. The severity of under-determinedness increases with model complexity (model dimensionality and span—more unknowns) and excitation signal correlation (narrow bandwidth—less information).

A model solution can be found through block-based processing where data is collected in blocks, processed directly to solve for the model parameters (solution) which are then applied to the model. Other attempts to provide a model solution involve gradient methods where an error signal is processed sample-by-sample, with each outcome driving directly the model parameters towards a minimized error and ultimately the solution. When applied to solve an under-determined system, both methods can be impaired and may be sensitive to bandwidth and type of model used. While both methods of adaptation are valid, they may also lack efficiency and robustness.

DETAILED DESCRIPTION

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical and electrical changes may be made without departing from the scope of the present invention. The following description of example embodiments is, therefore, not to be taken in a limited sense, and the scope of the present invention is defined by the appended claims.

The functions or algorithms described herein may be implemented in software or a combination of software and human implemented procedures in one embodiment. The software may consist of computer executable instructions stored on computer readable media such as memory or other type of storage devices. Further, such functions correspond to modules, which are software, hardware, firmware or any combination thereof. Multiple functions are performed in one or more modules as desired, and the embodiments described are merely examples. The software may be executed on a FPGA, ASIC, digital signal processor, microprocessor, or other type of processor operating on a computer system, such as a personal computer, server or other computer system.

The performance of the sample-by-sample adaptive processes is sensitive to the degree of under-determinedness and so is strongly dependent on the correlation properties of the excitation signal. Highly correlated excitation leads to: (1) poor convergence rates (poor tracking ability), (2) parameter drift (leading to eventual overflow in fixed point implementations), (3) excess error (suboptimal solution) in the case of systems requiring complex model structures, and (4) excess error in cases of plant over-modeling (an issue for any generalized model structure). These issues are of especial relevance in the adaptive linearization and equalization of modern transceivers where the trend is towards higher sample rates (higher signal correlation) and higher efficiency structures exhibiting increased nonlinearity and memory (more complicated models).

Several adaptive system architectures are described and make use of sample-by-sample controller for under-determined systems. Enhancements of sample-by-sample adaptive systems applied to under-determined systems are described. Specifically, they involve: (1) pre-conditioning of the adaptive process inputs, (2) constraining of the adaptive elements, and (3) modifying the internal mechanics of adaptation. Unlike other methods, one or more embodiments described may achieve improved adaptation performance in an under-determined system without alteration of the input/controlled signal, while remaining bandwidth- and model-agnostic.

Figure 1:
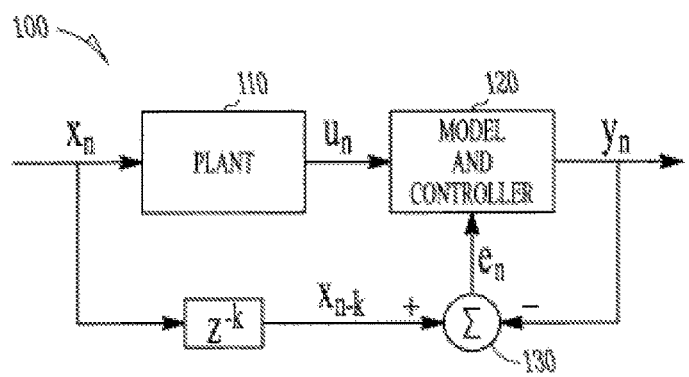
FIG. 1 is a block diagram of an equalizing controller for a receiver according to an example embodiment.
Figure 2:
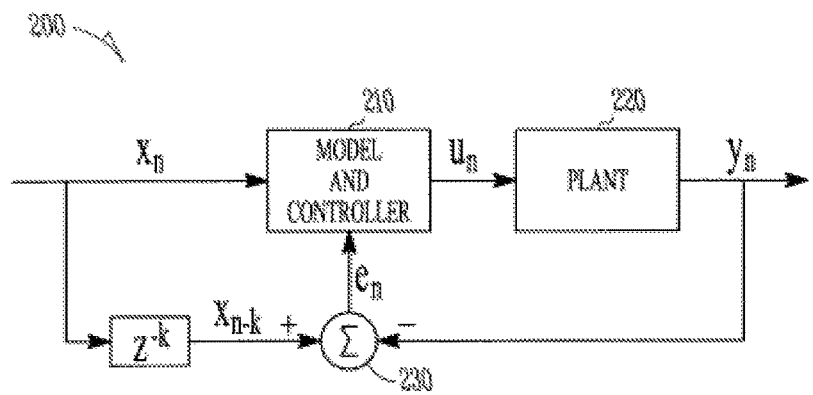
FIG. 2 is a block diagram of an inverse controller for a receiver according to an example embodiment.
Figure 3:
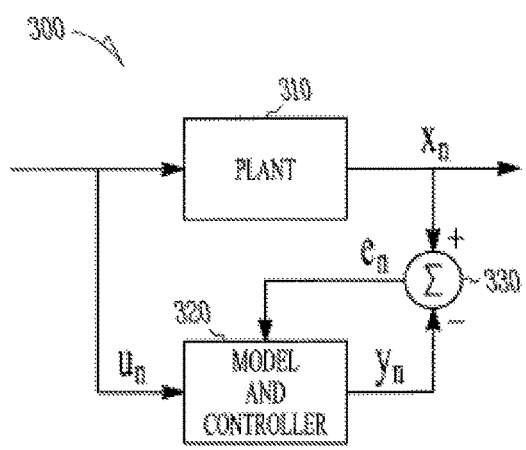
FIG. 3 is a block diagram of a tracking controller for a built in test feature according to an example embodiment.

FIGS. 1, 2 and 3 are block diagrams of various controllers in adaptive system architectures. In FIG. 1, a post-inverse modeling architecture 100 is illustrated and may be applied in a receiver for post-equalization or linearization for example. The receiver is represented by plant 110 which receives an input signal and provides an output to a model and controller 120, which provides an output signal. The output signal is combined with the input signal at summer 130 to provide an error signal back to the model and controller 120. Further details of the model and controller 120 for each of FIGS. 1, 2 and 3 are shown in FIG. 4.

In FIG. 2, inverse control as could applied in a transmitter for pre-equalization or pre-linearization (pre-distortion) is illustrated. In this architecture 200, an input signal is provided to a model and controller 210, which is coupled to plant 220. Plant 220 provides an output which is combined with the input at summer 230 which generates an error signal provided to the model and controller 210.

In FIG. 3, system identification as could be applied for BIST (Built In Self Test) features is illustrated. In this architecture 300, an input signal is provided to a plant 310 and model and controller 320. Outputs of the plant 310 and model and controller 320 are combined at summer 330, and an error signal is provided to model and controller 320. While the architectures 100 and 300 are realized through classic adaptive filter theory, architecture 200 is not, rather being realized through inverse control theory. In architecture 200 the model and controller 210 does not require the model output, $u_n$, to properly adapt.

Figure 4:
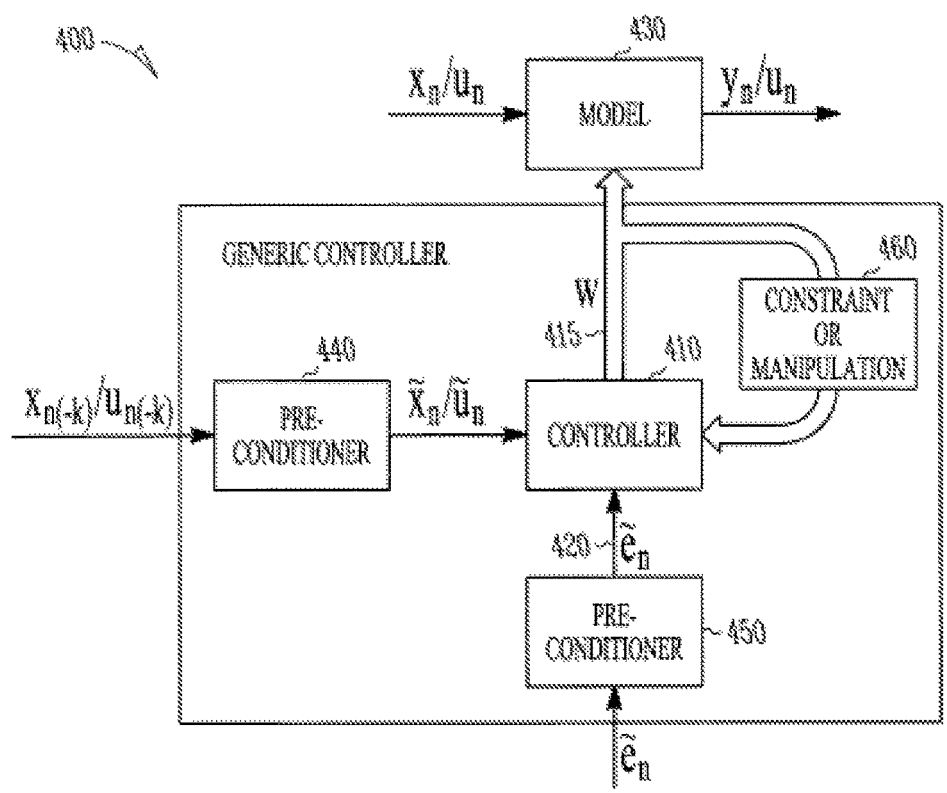
FIG. 4 is a block diagram of an adaptive sample-by-sample controller for an under-determined system according to an example embodiment.

A sample-by-sample controller device 400 for under-determined systems is depicted in FIG. 4. Through the proper application of signaling, a controller 410 can be applied in any of the architectures depicted in FIGS. 1, 2 and 3, and likely others. The controller 410 works to evolve model parameters, W at 415 such that after a convergence period, an error signal, $e_n$ at 420, is minimized, and the system of equations describing the model-plant architecture 430 has been solved.

As indicated in FIG. 4, signals for adaptation ($x_n$ or $u_n$ and $e_n$) may be preconditioned at 440 and 450 respectively before being applied in the adaptation process of controller 410. Although not shown in FIG. 4, the feedback signal, $y_n$, may also be preconditioned in certain embodiments. The preconditioning may provide decorrelation, and a consequent improvement of the sample-by-sample adaptation performance. In certain cases, system complexity can be reduced through the application of the pre-conditioner to either the reference or error signal rather than both. Examples of possible decorrelating pre-conditioners include fixed whitening filters, transforms, adaptive prediction filters, or self whitening systems.

The adaptive process applies the updated model parameters, W at 415, to the model 430. These parameters typically consist of complex coefficients of adaptive elements spanning both time and dynamic range. Parameter drift can be countered by allowing for the current model parameters to influence the adaptation process. This can be accomplished through two techniques: 1) manipulation of the individual model parameters, or 2) constraining a set of the model parameters across a dimension (e.g. at a given time offset or dynamic range level) as represented in a parameter control block 460. The former technique involves manipulation in such a manner as to counter drift or to introduce decorrelating virtual noise across the full system bandwidth.

An example of such manipulation would be a variant of a leakage technique. The latter technique involves application of a macro constraint to a group of parameters, such as a set of parameters corresponding to an instance of a dimension, restricting the solution space (effectively reducing the number of unknowns) and reducing vulnerability to parameter drift. The fixing or restriction of the root mean square (RMS) value of a single or multiple taps of an adaptive filter through the application of an adaptive controller would fall under this technique. Thus, the parameter control 460 is coupled to the controller 410 to control parameters provided to the model 430 by controller 410.

In various embodiments, a generic adaptive sample-by-sample controller structure may be insensitive to system architecture, model complexity, and input signal. Such a controller can therefore be applied to service any number of features in a System-on-Chip (SoC) product, regardless of their nature, enabling the efficiency of a single shared adaptation engine.

Figure 5:
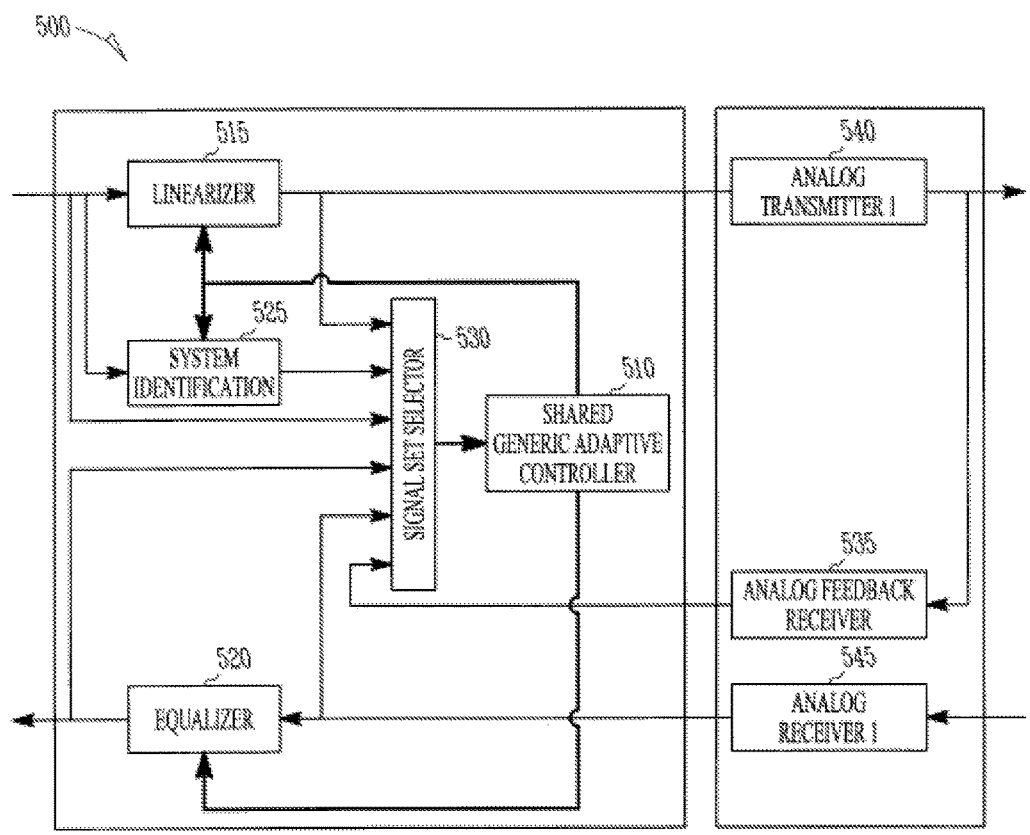
FIG. 5 is a block diagram of a shared adaptive controller according to an example embodiment.

FIG. 5 at 500 depicts an example embodiment of an agnostic controller 510 applied as a single shared resource in a transceiver. Agnostic controller 510 in one embodiment is a shared generic adaptive controller with parameter control as previously described. Controller 510 may provide service to several distinct features, such as a linearizer 515, equalizer 520 and system identifier 525. A signal set selector 530 operates to provide signals to the controller 510 corresponding to those used for providing service to such features. Such signals generally include outputs from each of the features, referred to as feature input signals, as well as an input signal to the linearizer 515. The signal set selector 530 may also provide outputs from an analog feedback receiver 535 that receives output from an analog transmitter 540, and from an analog receiver 545. Signal set selector 530 may also include one or more preconditioners to decorrelate such input signals. Depending on the implementation, error generation can be performed either within the set selector or within the generic controller.

Figure 6:
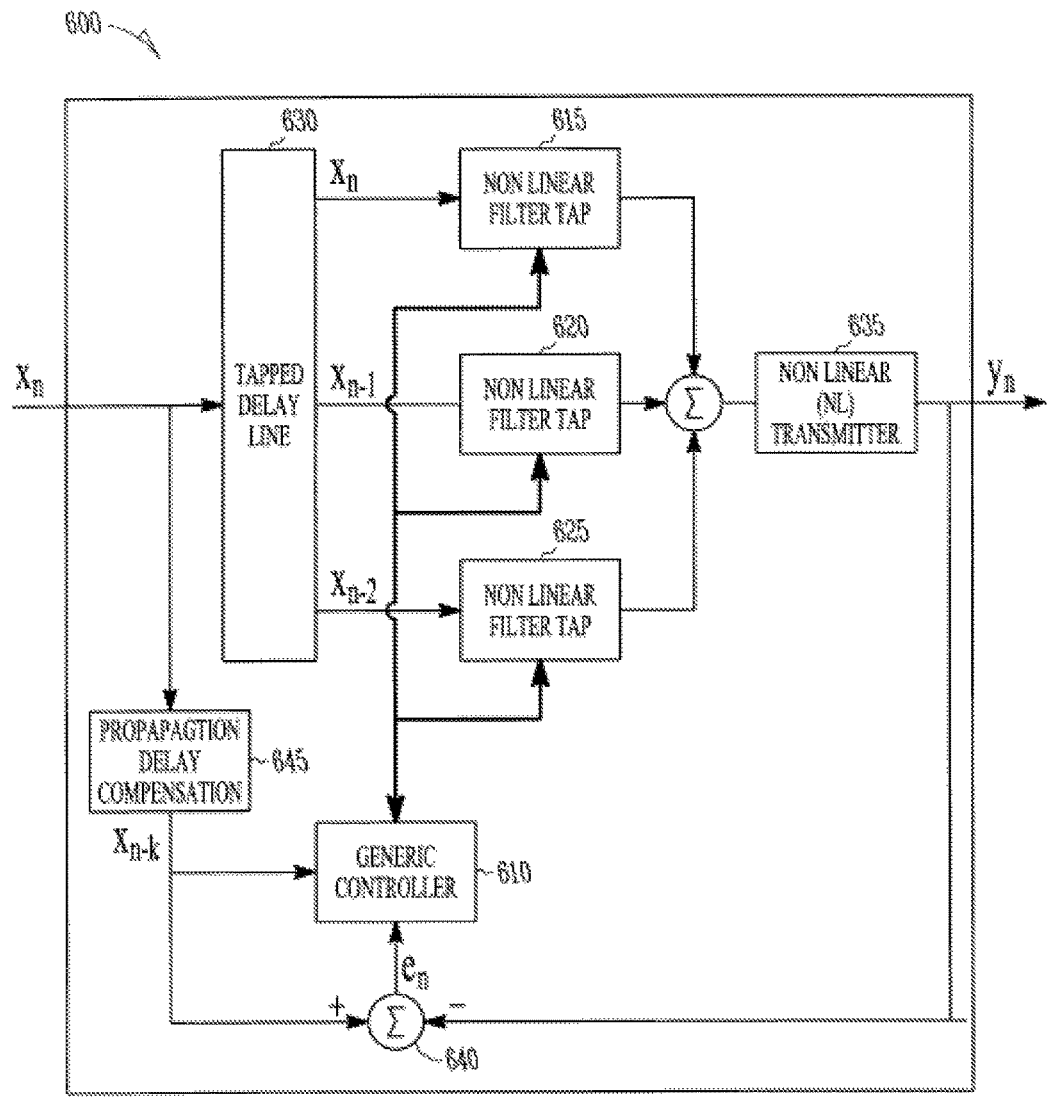
FIG. 6 is a block diagram of an example embodiment of a linearizer feature employing a single agnostic controller shared among time delayed non-linear taps according to an example embodiment.

FIG. 6 depicts an example embodiment of a linearizer feature 600 employing a single agnostic controller 610 shared among time delayed non-linear taps 615, 620 and 625. Time delays may be provided by a tapped delay line 630. Controller 610 is a generic adaptive sample-by-sample controller that can be shared across a dimension within feature model 600. In one embodiment, the linearizer feature 600 provides linearization for a non-linear transmitter 635. An error signal for the generic controller 610 may be provided by summing, at 640, the output of the transmitter 635 with a propagation delay compensated, at 645, input signal.

One or more embodiments described may exhibit one or more of the following characteristics. Adaptation may be signal agnostic and system (architecture and model) agnostic. Residual error may be reduced, and robustness improved in the case of complex and over modeled systems. Adaptive signal paths alone may be manipulated to achieve improved adaptation performance leaving the transmission signal untouched. One or more embodiments may provide improved immunity to numerical quantization effects.

Further, implementation of some embodiments may be very efficient. Using a sample-by-sample solution, blocks of data need not be processed. Methods can be applied once to adaptive paths of multiple controllers. Compatibility with modular architectures with shared adaptation circuitry, and model/signal agnosticism allows a single adaptive engine to service filters and linearizers, as well as across taps and model dimensions.

Various embodiments described may be applied to improve the performance, efficiency and size of signal transmitters in different fields such as, but not limited to, RF transmission, Hi-Fi audio, Hi-Fi video, optical transmission and, generally, in systems where high-quality of electrical/ electro-mechanical/electro-optical/electro-magnetic signal transformation has to be achieved.

Specifically, the adaptation methods described may be applied in Volterra series power amplifier linearization which may be used in cellular radios of various standards such as for example CDMA, WiMax and UMTS. Future applications may include 4G/LTE radio development and include applications in observation receiver linearization and equalization, receiver linearization and equalization, BIST, and system with transceiver diversity including Digitally Convertible Radio and/or power combining features.

The Abstract is provided to comply with 37 C.F.R. § 1.72(b) to allow the reader to quickly ascertain the nature and gist of the technical disclosure. The Abstract is submitted with the understanding that it will not be used to interpret or limit the scope or meaning of the claims.

The invention claimed is:

1. A system for adapting a model, comprising:
a signal set selector coupled to receive signals comprising two or more of input signals to and output signals from multiple features and one or more communications components, and provide a reference signal based at least in part on one or more of the received signals, wherein the multiple features include two or more of a linearizer, an equalizer, or a system identifier and the one or more communications components include one or more of an analog feedback receiver, an analog transmitter, or an analog receiver; and
an adaptive sample-by-sample controller coupled to receive the reference signal and to provide sample-by-sample control of the multiple features based at least in part on the reference signal, the adaptive sample-by-sample controller comprising:
a controller that provides model parameters to the model; and
a parameter control coupled to the controller to control a set of parameters from multiple sets of parameters which is provided to the model by the controller as a function of bandwidth of the reference signal.

2. The system of claim 1, wherein the signal set selector comprises one or more preconditioners for decorrelating one or more input or feature input signals.

3. The system of claim 2, wherein the preconditioners include at least one of a fixed whitening filter, an adaptive prediction filter, or a self-whitening system.

4. The system of claim 1, wherein the adaptive sample-by-sample controller is agnostic with respect to input signals or model complexity.

5. The system of claim 1, wherein the adaptive sample-by-sample controller is shared among multiple delayed non-linear taps.

6. A method for adapting a model in an adaptive system of a radio transmitter, the method comprising:
receiving signals comprising two or more of input signals to and output signals from multiple features and one or more communications components, wherein the multiple features include two or more of a linearizer, an equalizer, or a system identifier and the one or more communications components include one or more of an analog feedback receiver, an analog transmitter, or an analog receiver;
providing a reference signal to an adaptive sample-by-sample controller, the reference signal based at least in part on one or more of the received signals;
providing, by a controller, model parameters to the model;
controlling, by a parameter control coupled to the controller, a set of parameters from multiple sets of parameters which is provided to the model by the controller as a function of bandwidth of the reference signal; and
controlling the multiple features based at least in part on the reference signal.

7. The method of claim 6, further comprising decorrelating one or more input or feature input signals.

8. The method of claim 7, wherein the decorrelating includes applying at least one of a fixed whitening filter, an adaptive prediction filter, or a self-whitening system.

9. The method of claim 6, wherein the adaptive sample-by-sample controller is agnostic with respect to input signals or model complexity.

10. The method of claim 6, wherein the adaptive sample-by-sample controller is shared among multiple delayed non-linear taps.

11. A non-transitory computer-readable memory comprising instructions executable by a processor to perform operations for adapting a model comprising:
receiving signals comprising two or more of input signals to and output signals from multiple features and output signals from one or more communications components, wherein the multiple features include two or more of a linearizer, an equalizer, or a system identifier and the one or more communications components include one or more of an analog feedback receiver, an analog transmitter, or an analog receiver;
providing a reference signal to an adaptive sample-by-sample controller, the reference signal based at least in part on one or more of the received signals;
providing, by a controller, model parameters to the model;
controlling, by a parameter control coupled to the controller, a set of parameters from multiple sets of parameters which is provided to the model by the controller as a function of bandwidth of the reference signal; and
controlling the multiple features based at least in part on the reference signal.

12. The non-transitory computer-readable memory of claim 11, the instructions executable to perform operations comprising decorrelating one or more input or feature input signals by applying at least one of a fixed whitening filter, an adaptive prediction filter, or a self-whitening system.

13. The non-transitory computer-readable memory of claim 11, wherein the adaptive sample-by-sample controller is agnostic with respect to input signals or model complexity.

14. The non-transitory computer-readable memory of claim 11, wherein the adaptive sample-by-sample controller is shared among multiple delayed non-linear taps.

* * * * *